Patented July 14, 1931

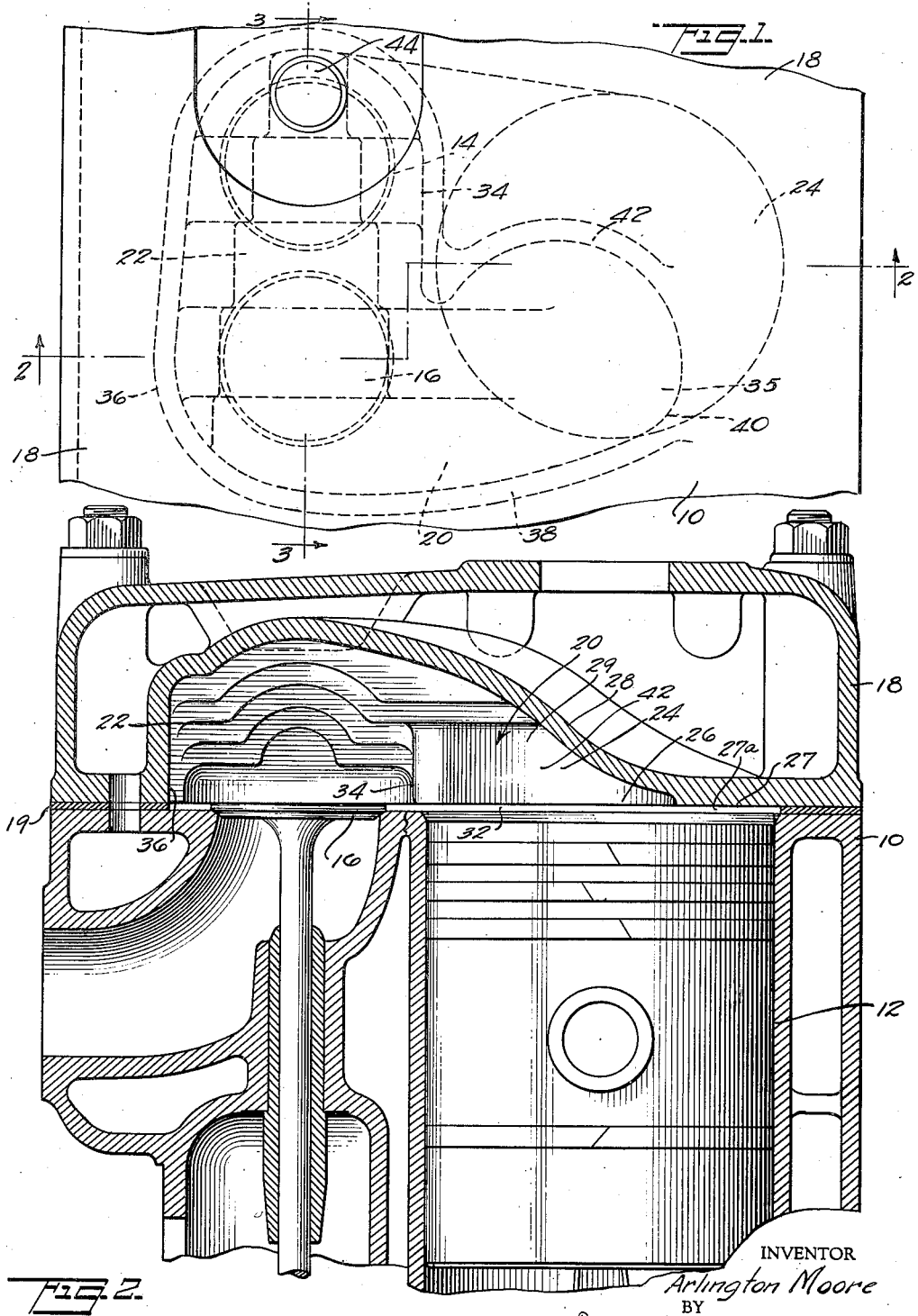

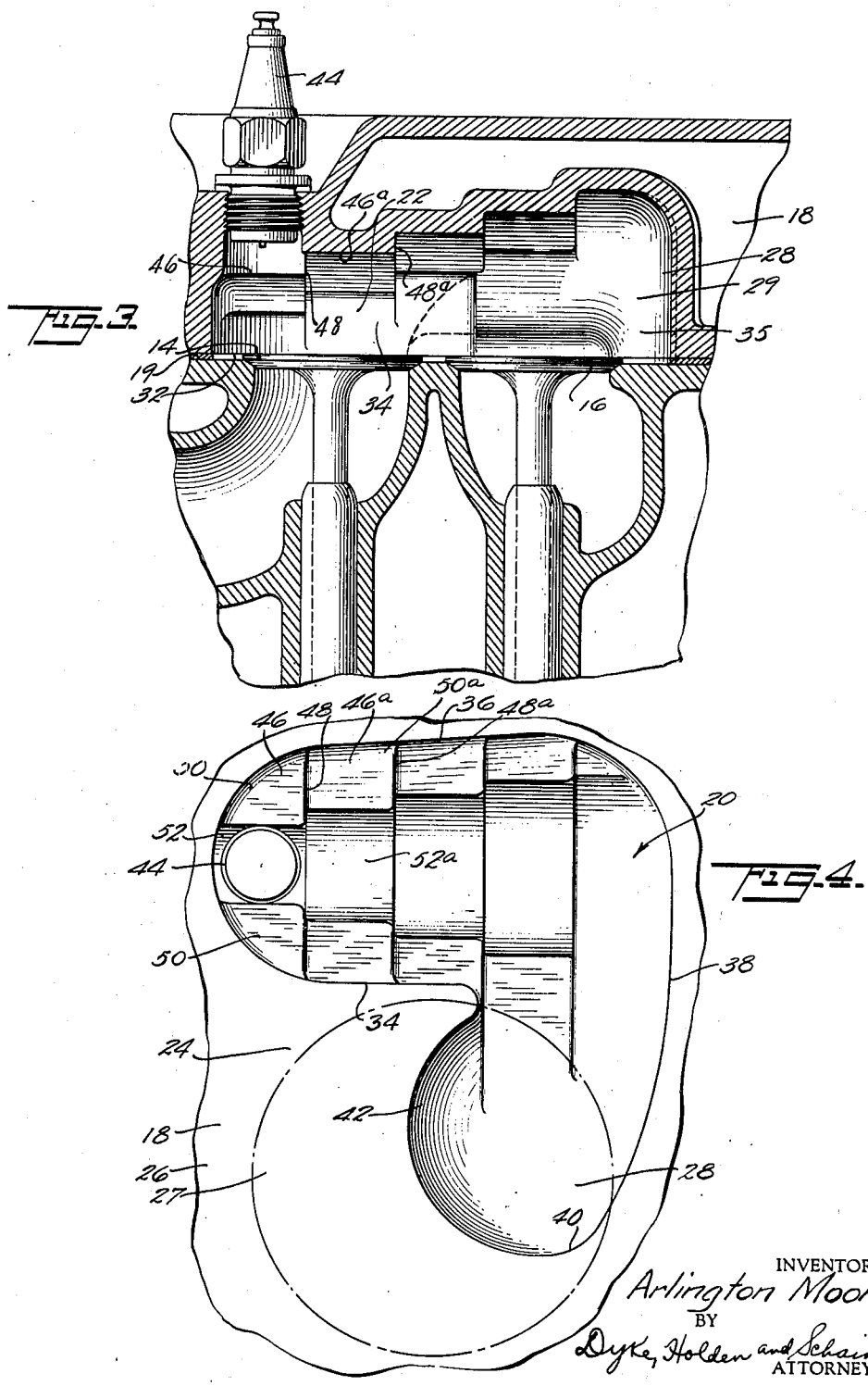

1,814,523

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

COMBUSTION CHAMBER CONSTRUCTION FOR INTERNAL COMBUSTION ENGINES

Application filed April 1, 1930. Serial No. 440,693.

My invention relates to the combustion chamber of internal combustion engines.

Objects of my invention are provisions of an engine, in which the incoming gases sweep over the head of the hot exhaust valve, thereby heating the incoming mixture and cooling the exhaust valve; in which the outgoing gases are so propelled by the rising piston as to be guided toward and concentrated at the exhaust valve, giving efficient scavenging; in which a high degree of turbulence is obtained at and preceding combustion productive of a homogeneous charge mixture; and in which detonation or knocking is avoided by the imparting of turbulence to the charge, and controlling the heat and the flame propagation so that the development of auto-ignition temperatures and pressures during flame propagation is prevented.

With these and related objects in view, I have shown an illustrated embodiment of my invention in the accompanying drawings, in which Figure 1 is a plan with parts broken away of one form of internal combustion engine constructed according to and embodying my said invention;

Fig. 2 is a vertical section thereof on the line 2—2 of Fig. 1;

Fig. 3 is a vertical section thereof on the line 3—3 of Fig. 1; and

Fig. 4 is a bottom plan of a portion of a cylinder head.

The cylinder block 10 is illustrated as of the standard L-head form, with cylinder bores 12 and inlet valves 14 and exhaust valves 16 disposed laterally of the cylinder bores and arranged in a right line so as to be operated from the usual single cam shaft located low down in the engine, alongside the crankshaft and driven directly therefrom.

The hollow water containing cylinder head 18 is disposed upon the cylinder block 10 with a gasket 19 therebetween, the cylinder head and cylinder block forming the combustion chamber 20 therebetween. The part 22 of the combustion chamber 20 over the valves 14, 16 is preferably of ample size to permit of free valve movement and provide plenty of room for ingress and egress movements of the charge gases and products of combustion.

The portion 24 of the combustion chamber ceiling which overlies the cylinder bore 12 consists of two principal parts, a thicker part 26 having a flat lower surface 27 in close relation to the piston in the top center portion thereof and forming a constricted combustion chamber space $27^a$, and a part 28 of reduced thickness providing a combustion chamber portion 29 of greater height and clearance above the piston in the top center position thereof. The part 26 with my improvement extends inwardly over a major portion of the cylinder bore 12, and the portion $27^a$ communicates with the combustion chamber portion 22 contiguous to the intake valve, through a narrow opening or vent 32 having a depth corresponding with the thickness of gasket 19.

The water backed portion 26 of the cylinder head at the valve side thereof forms an inner lateral wall portion 34 of the combustion chamber portion 22 serving to direct and guide the charge gases, entering through the intake valve and passing into the cylinder bore, so that they will largely sweep across the head of the hot exhaust valve 16 and absorb heat therefrom.

The remaining portion 36 of the lateral wall of the combustion chamber portion 22 formed as a continuation from the intake valve end of the wall portion 34, encloses the opposite side of the combustion chamber portion 22 and swings transversely towards the cylinder at the exhaust valve end thereof, as indicated at 38, and intersects the cylinder bore, as indicated at 40. The portion 26 has a vertical wall portion 42 forming a substantially right angular continuation of the wall portion 34 directed towards the cylinder opposite the wall portion 40 to form therewith and the downwardly sloping ceiling portion 28 the enlarged opening 35 to the cylinder bore from chamber 22, the wall portion 42 being preferably formed arcuate or concave as shown at Fig. 1.

The spark plug 44 is preferably located over or adjacent to the intake valve 14 within the chamber portion 22 so that upon ignition the propagation of flame follows substantially the same route of travel as the charge material entering the cylinder.

The combustion chamber portion 22 from the spark plug 44 to the cylinder is of increasing cross-section or volume, and the ceiling thereof is preferably formed as a series of steps 46, 46ª, etc., of increasing elevation towards the entrance 35, and having the intermediate riser portions 48, 48ª, etc. Each step 46, 46ª is preferably formed with relative flat outer portions 50, 50ª, etc., and a recessed or concave intermediate portion 52, 52ª, etc., the recesses 52, 52ª, etc., increasing successively in width and elevation to form a channel or "canyon" increasing in size by abrupt changes from the spark plug in the direction of flame propagation. The step formation of the ceiling also increases the extent of water backed surface exposed to the hot gases and increases the heat absorbing capacity thereof.

The operation (necessarily in large part assumed because not directly observable) comprises efficient agitation and mixing of the charge, on both the intake and compression strokes due to swirling of the gases which pass freely through entrance 35 and are relatively retarded through opening 32. On the intake stroke of the piston, as the intake valve 14 opens, the charge material enters the chamber portion 22 and passes largely towards and over the exhaust valve 16, and then is deflected by the wall portion 38 into the cylinder entrance 35. The exhaust valve being highly heated from the previous explosion, gives up heat to the incoming charge which effectively cools the valve, preventing the burning thereof, the exhaust valve being utilized to supply the incoming charge with useful heat otherwise lost. During this heating, the incoming charge material is considerably agitated because of its deflection towards the cylinder, causing turbulence or swirling and producing a heated homogeneous mixture of fuel and air in a most efficient state for burning. The charge material being deflected through the substantially right-angular passage 35 tends to acquire a rotational movement by its discharge into the cylinder, but the walls 40 and 42 as arranged tend to direct the flow into the cylinder non-tangentially relative thereto so as to prevent the formation of a vortex in the central region of the cylinder, and thereby insure filling of the cylinder with charge mixture of substantially uniform density. The area of the passage 35 in plan or at the base thereof is relatively small compared to the total cross-sectional area of the cylinder bore, but the height thereof is made sufficiently large to permit of efficient cylinder charging.

My combustion chamber construction provides a lateral combustion chamber or charge directing passage which progressively increases in size from the spark plug to the cylinder entrance for the purpose hereinafter described and highly restricted space over the major portion of the piston in the top center position thereof, the low ceiling 27 over the cylinder having the maximum area permissible.

Upon the compression stroke the movement of the charge mixture is substantially reversed, and the combustion chamber passages because of their formation enhance considerably the agitation of the gases. As the pressure approaches a maximum, when the piston is approaching its top center position, the gases compressed against the low ceiling 27 are squeezed outwardly through narrow opening 32 into the combustion chamber portion 22, thus producing an agitational movement of the gases productive of more uniform distribution of heat therethrough, and increased absorption of excessive heat by the water-backed walls, whereby to control the temperature of the charge to prevent preignition.

Upon ignition of the charge at the smallest end of the chamber portion 22, or as I will term it, the smaller end of the "flame canyon", the propagation of the flame is more or less uniform because of the travel thereof through the increasingly enlarging passage over the valves, in which the flame wave is prevented from reaching a detonation velocity because of the progressive expansion thereof as the same approaches the cylinder. The flame wave is thus prevented from attaining a velocity liable to cause detonation both by the expansional effect and agitational effect of the combustion chamber 20 on the charge. The flame propagation is thus controlled until maximum pressure of the gases is obtained, so that the expansion of such gases on the power stroke will be uniform.

During the flame propagation in the region over the valves, any tendency of excess pressure waves forming is also arrested by venting this pressure through the narrow passage 32 providing communication between the cylinder under the low ceiling 27 of the combustion chamber and the passage 22 over the valves, and likewise, upon compression, these gases are squeezed through this narrow passage 32 into the lateral combustion chamber space, causing the flame to more rapidly spread, and thereby accelerating combustion.

There is a free propagation of flame through passage 35 into the chamber portion above the piston with relatively retarded flame propagation through opening 32, so that the flame wave, from behind the relatively abrupt or straight up and down wall part 34 on the valve side reaches the gases in the cylinder part of the combustion chamber from two directions and at different intervals of time, and furthermore the step and riser construction of the ceiling of the chamber part 22 affords opportunity for repeated expansion steps taking place therein, so that with the capacity for repeated expansion of the gases, and with the agitation which is taking place, and the propagation of flame in different directions and at different intervals of time, the possibility is reduced of any stagnant pockets of charge material getting into condition of temperature and pressure to cause their flashing into self-ignition and thereby producing the effect of so-called detonation.

Excessive temperatures also cause decomposition of the fuel and localized burning of the constituents productive of nonuniformity in density and temperature of the charge mixture. The combustion chamber, however, because of the stepped formation thereof provides extended water backed surfaces for conducting excess heat from the mixture to maintain relative lower temperatures, and thereby complements the expansional effect thereof in preventing the development of flame velocities liable to cause detonation. The turbulent movement of the gases over the water-backed surfaces facilitates the absorption of heat by the water.

It is also necessary that the flame spreads throughout the entire mass of the charge in the slight interval between the time of ignition and the attainment of maximum pressure. Therefore, in order to insure such complete spreading of the inflammation, the assistance of turbulence is advantageous, particularly in compensating for the locating of the spark plug at the remote end of the chamber rather than at a central point where the flame would be more rapidly propagated to the most remote points.

Upon the exhaust stroke, the intake valve being closed and the exhaust valve open, the rising piston squeezes and pushes the exhaust gases through the passage 35 of gradually increasing height directly towards and out past the open exhaust valve 16.

By change in the form of cylinder head casting to embody my said invention, improved result in engine operation is obtained, and the use is permitted of higher compression ratios, and fuels of lesser volatility than gasoline, if so desired.

The invention is shown applied to an L-head engine to which it is well adapted, although it may be applied to other engines as well.

I claim:

1. An internal combustion engine comprising a cylinder block having a cylinder bore therein, intake and exhaust valve disposed laterally relative to the cylinder bore, and a cylinder head including a relatively low portion having a substantially flat lower surface overlying the portion of the cylinder bore adjacent to the intake valve to form a highly restricted clearance over the piston in the top center position thereof and including a relatively reduced angular portion forming a combustion chamber over the valves and over the remaining portion of the cylinder bore adjacent to the exhaust valve, said relatively low portion forming the inner lateral wall of the combustion chamber and providing a vent between said clearance and said combustion chamber adjacent to the intake valve.

2. An internal combustion engine comprising a cylinder block having a cylinder bore therein, intake and exhaust valves disposed laterally relative to the cylinder bore, and a cylinder head having a relatively low portion overlying a portion of the cylinder bore to form a highly restricted clearance over the piston in the top center position thereof and having relatively reduced angularly arranged communicating portions forming a combustion chamber over the valves and the remaining portion of the cylinder bore, certain of said reduced portions having a ceiling of step formation.

3. An internal combustion engine comprising a cylinder block having a cylinder bore therein, intake and exhaust valves disposed laterally relative to said bore, and a cylinder head having a relatively low portion overlying a portion of the cylinder bore to form a highly restricted clearance of substantially uniform depth over the piston in the top center position thereof, and having relatively reduced angularly arranged communicating portions forming a combustion chamber disposed over the valves and the remaining portion of the cylinder bore, said relatively low portion forming the inner portion of the lateral wall of said combustion chamber and providing a restricted opening of the same depth as said clearance between said clearance and the combustion chamber adjacent to the intake valve.

4. An internal combustion engine comprising a cylinder block having a cylinder bore therein, intake and exhaust valves disposed laterally relative to the cylinder bore, and a cylinder head including a relatively low portion having a substantially flat lower surface overlying the portion of the cylinder bore adjacent to the intake valve to form a highly restricted clearance over the piston in the top center position thereof and including a relatively reduced angular portion forming a combustion chamber over the valves and over the remaining portion of the cylinder bore adjacent to the exhaust valve, said relatively low portion forming the inner lateral wall of the combustion chamber and providing a vent between said clearance and the combustion chamber adjacent to the intake valve, the remaining part of the lateral wall of the combustion chamber extending around the exhaust valve with an easy sweeping curve intersecting said cylinder bore, and the ceiling of the part of the combustion chamber over the cylinder bore sloping downwardly towards the side thereof remote from the exhaust valve.

5. In an internal combustion engine, a cylinder block having a cylinder bore therein, a wall portion forming a combustion chamber, and intake and exhaust valves disposed therein, said wall portion forming a barrier between the intake valve and the cylinder bore and serving to direct the charge entering through the intake valve over the exhaust valve and therefrom to deflect said charge into the cylinder bore, the portion of said combustion chamber over said valves increasing in volume in the direction of charge flow and flame propagation.

6. In an internal combustion engine, a cylinder block having a cylinder bore, intake and exhaust valves disposed laterally relative to the cylinder bore, and a cylinder head having a combustion chamber passage formed to direct the charge entering through said intake valve over said exhaust valve and therefrom into the cylinder bore, the portion of said passage over the valves increasing in cross-section in the direction of charge flow, and ignition means at the smaller portion of the passage.

7. In an internal combustion engine, a cylinder block having a bore, a cylinder head forming a combustion chamber therewith, and intake and exhaust valves disposed therein, the portion of said combustion chamber over the cylinder bore at the intake valve side being restricted and the portion thereof at the exhaust valve side being relatively enlarged, whereby to direct the charge entering through said intake valve over said exhaust valve and therefrom to deflect the charge into the cylinder bore, the portion of the combustion chamber over the valves increasing in volume in the direction of charge flow and flame propagation.

8. In an internal combustion engine, a wall portion forming a combustion chamber having a part over the valves and a part over the cylinder, and means of communication between said parts including a constricted opening and a relatively enlarged opening, and serving to retard the passage of gases and flame propagation through said constricted opening and to accelerate the passage of said gases and flame propagation through said enlarged opening, the part of said combustion chamber over the valves increasing in volume in the direction of flame propagation.

9. In an internal combustion engine, a wall portion forming a combustion chamber having a part over the valves and a part over the cylinder bore, a portion of the combustion chamber part over the cylinder bore being relatively restricted adjacent to the intake valve, and the remaining portion of said combustion chamber part over the cylinder bore communicating with the first named combustion chamber part through a relatively enlarged opening adjacent to the exhaust valve, and the ceiling of said first named combustion chamber part being of step formation.

10. In an internal combustion engine, a cylinder block having a cylinder bore, laterally disposed intake and exhaust valves, a wall portion forming a combustion chamber having a part over the cylinder bore and a part over said valves, said wall portion being relatively low over the portion of the cylinder bore at the side adjacent to the intake valve and providing a relatively restricted communication between the combustion chamber parts and relatively enlarged communication between said parts at the side adjacent to the exhaust valve, said valve part of the combustion chamber increasing in volume in the direction of flame propagation, and a spark plug disposed therein.

11. In an internal combustion engine, a wall portion forming a combustion chamber having a part over the intake and exhaust valves and a part over the cylinder bore intercommunicating with each other through a relatively constricted opening adjacent to the intake valve and through a relatively enlarged opening adjacent to the exhaust valve, and the part of said combustion chamber above said valves having a step formation.

12. In an internal combustion engine, a cylinder block having a cylinder bore, intake and exhaust valves, a wall portion forming a combustion chamber having a part over the cylinder bore and a part over the valves and having a relatively enlarged passage therebetween at the exhaust valve side and a relatively constricted passage therebetween at the intake valve side, and the height of the part of the combustion chamber over the valves increasing by steps from the intake valve to the exhaust valve and said enlarged passage.

13. In an internal combustion engine, a wall portion forming a combustion chamber having a part over the valves and a part over the cylinder, the combustion chamber part over the cylinder being relatively restricted adjacent to the intake valve and communicating with the first named combustion chamber part through a relatively narrow passage and being relatively enlarged adjacent to the exhaust valve and communicating with the first named combustion chamber part through a larger opening, the ceiling of said first named combustion chamber part being of step formation increasing in height from the intake valve towards the exhaust valve.

14. In an internal combustion engine, a cylinder block having a cylinder bore, intake and exhaust valves at one side of the cylinder bore, and a cylinder head forming a combustion chamber over said cylinder bore and said valves, and including a portion relatively restricting a portion of the cylinder bore and providing a narrow opening into the portion of the combustion chamber adjacent to the intake valve, and providing a relatively enlarged opening between the remaining portion of the cylinder bore and the portion of the combustion chamber adjacent to the exhaust valve, whereby to direct the charge entering through the intake valve largely over the exhaust valve into the enlarged opening, the ceiling of the portion of the combustion chamber over the valves being of step formation increasing in height from the intake valve toward the exhaust valve and having an intermediate recess therein increasing in width towards the exhaust valve, and ignition means at the smaller end of the portion of the combustion chamber over the valves.

15. In an internal combustion engine, a cylinder block having a cylinder bore therein, intake and exhaust valves disposed laterally relative to the cylinder bore, and a cylinder head having a relatively low portion overlying a portion of the cylinder bore to form a highly restricted clearance over the piston in the top center position thereof and having relatively reduced angularly arranged portions forming a combustion chamber over the valves and the remaining portion of the cylinder bore, the portion of the combustion chamber over the valves having a ceiling of step formation increasing in height towards the cylinder bore.

16. In an internal combustion engine, a cylinder block having a cylinder bore therein, intake and exhaust valves disposed laterally relative to said bore, and a cylinder head having a relatively low portion overlying a portion of the cylinder bore to form a highly restricted clearance of substantially uniform depth over the piston in the top center position thereof, and having relatively reduced angularly arranged portions forming a combustion chamber over the valves and the remaining portion of the cylinder bore increasing in cross-section towards the cylinder bore, said relatively low portion forming the inner portion of the lateral wall of said combustion chamber, and providing a restricted opening below the same between said clearance and the combustion chamber adjacent to the intake valve.

17. A cylinder head for four-cycle L-head internal combustion engines having a combustion chamber therein of relatively greater height over the valves and over the portion of the cylinder bore adjacent to the exhaust valve than over the portion of the cylinder bore adjacent to the intake valve, and relatively enlarged and narrow passages therebetween, the height of the ceiling of the combustion chamber over the valves increasing by gradual steps towards the enlarged passage, and a spark plug adjacent to the intake valve.

18. A cylinder head for four-cycle, L-head internal combustion engines, having a combustion chamber therein which is relatively high over the valves and relatively low over the cylinder bore at the intake valve side and relatively high thereover at the exhaust valve side, the height of the part over the valves increasing by abrupt steps away from the intake valve towards the exhaust valve, and a spark plug in said head located substantially at the intake valve position.

In testimony whereof, I have signed my name hereto.

ARLINGTON MOORE.